(12) United States Patent
Sabandith

(10) Patent No.: US 10,341,530 B1
(45) Date of Patent: Jul. 2, 2019

(54) SYSTEM AND METHOD FOR OBFUSCATING INDICIA ON REUSABLE MEDIA

(71) Applicants: Kabushiki Kaisha Toshiba, Minato-ku (JP); Toshiba TEC Kabushiki Kaisha, Shinagawa-ku (JP)

(72) Inventor: Milong Sabandith, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/913,345

(22) Filed: Mar. 6, 2018

(51) Int. Cl.
- *G06K 15/00* (2006.01)
- *H04N 1/00* (2006.01)
- *H04N 1/44* (2006.01)
- *H04N 1/12* (2006.01)
- *G06F 3/12* (2006.01)

(52) U.S. Cl.
CPC ......... *H04N 1/4493* (2013.01); *G06F 3/1222* (2013.01); *G06F 3/1242* (2013.01); *H04N 1/00803* (2013.01); *H04N 1/121* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2004/0080787 A1* | 4/2004 | Kakikawa | B41M 7/0009 358/1.18 |
| 2005/0002053 A1* | 1/2005 | Meador | H04N 1/4446 358/1.14 |

* cited by examiner

*Primary Examiner* — Dov Popovici
(74) *Attorney, Agent, or Firm* — Ulmer & Berne LLP

(57) ABSTRACT

A system and method for obfuscating indicia on reused printing media includes a scanner and a printer. A sheet feeder communicates a paper sheet for scanning and the sheet is scanned to generate a digital image which is analyzed to determine a presence of indicia on the paper surface. One or more areas of the paper surface containing indicia are identified and an overprint is commenced in the one or more areas encompassing identifiable indicia. The overprinted sheet containing the indicia and the overprint is then erased.

20 Claims, 4 Drawing Sheets

SYSTEM AND METHOD FOR OBFUSCATING INDICIA ON REUSABLE MEDIA

TECHNICAL FIELD

This application relates generally to safeguarding sensitive or private information on printed media. The application relates more particularly to safeguarding text or graphic indicia that may still be visible when erased paper is reused for subsequent printing.

SUMMARY

In an example embodiment a system and method for an obfuscating indicia on reused printing media includes a scanner and a printer. A sheet feeder communicates a paper sheet for scanning and the sheet is scanned to generate a digital image which is analyzed to determine a presence of indicia on the paper surface. One or more areas of the paper surface containing indicia are identified and an overprint is commenced in one or more areas encompassing identifiable indicia. The overprinted sheet containing the indicia and overprint is then erased.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Electronic documents play a growing role in society. Early communications included mailing of letters, delivery of printed newspapers, sending greeting cards and reading magazines. Electronic documents, such as e-mail, newspaper e-editions, and web pages play a growing role in society. However, electronic documents require a digital device such as a desktop or notebook computer, a tablet computer or a smartphone for creation and viewing. Tangible renderings of electronic documents are still frequently needed and frequently used. People may find it easier to read a printed document. People may find it easier to edit or markup tangible documents using a pen, pencil or highlighter. Tangible documents can be posted for viewing, such as when a paper saying "On Vacation until October 19$^{th}$" is printed and taped on an office door.

A dominant use of MFPs is in connection with printing tangible copies of electronic documents. Printing requires using consumables, such as paper, toner or ink. Many documents are printed for a single, short term use. This may include uses such as initial drafts, e-mails, memos or recipes. Paper costs for such uses can be significant.

Recent advances in MFP design includes Toshiba's e-STUDIO307LP eco printer which includes a toner that can be erased so that paper can be reused, even reused multiple times. Erasable toner includes toner, in addition to black toner, that can be a blue color. Printing with a blue colored toner serves as an indicator that the associated paper can be erased and reused.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs such as e-STUDIO307LP described above include a function that erases papers that are reintroduced to the device for reuse in printing. When the MFP erases a document, it may leave a discernable ghost image of indicia such as pictures or characters that were on the prior document due to incomplete erasure. Erasable black toner may leave a darker ghost image than blue toner given black toner's higher contrast on white paper media. This is often acceptable, particularly when the printed document is used informally and for a short period of time. While residual indicia ghosting may not be of concern due to its presence on reused paper, it is problematic when the residual indicia allows one to discern confidential or sensitive information. Embodiments herein facilitate obfuscating of prior indicia to maintain confidentiality.

Figure 1:
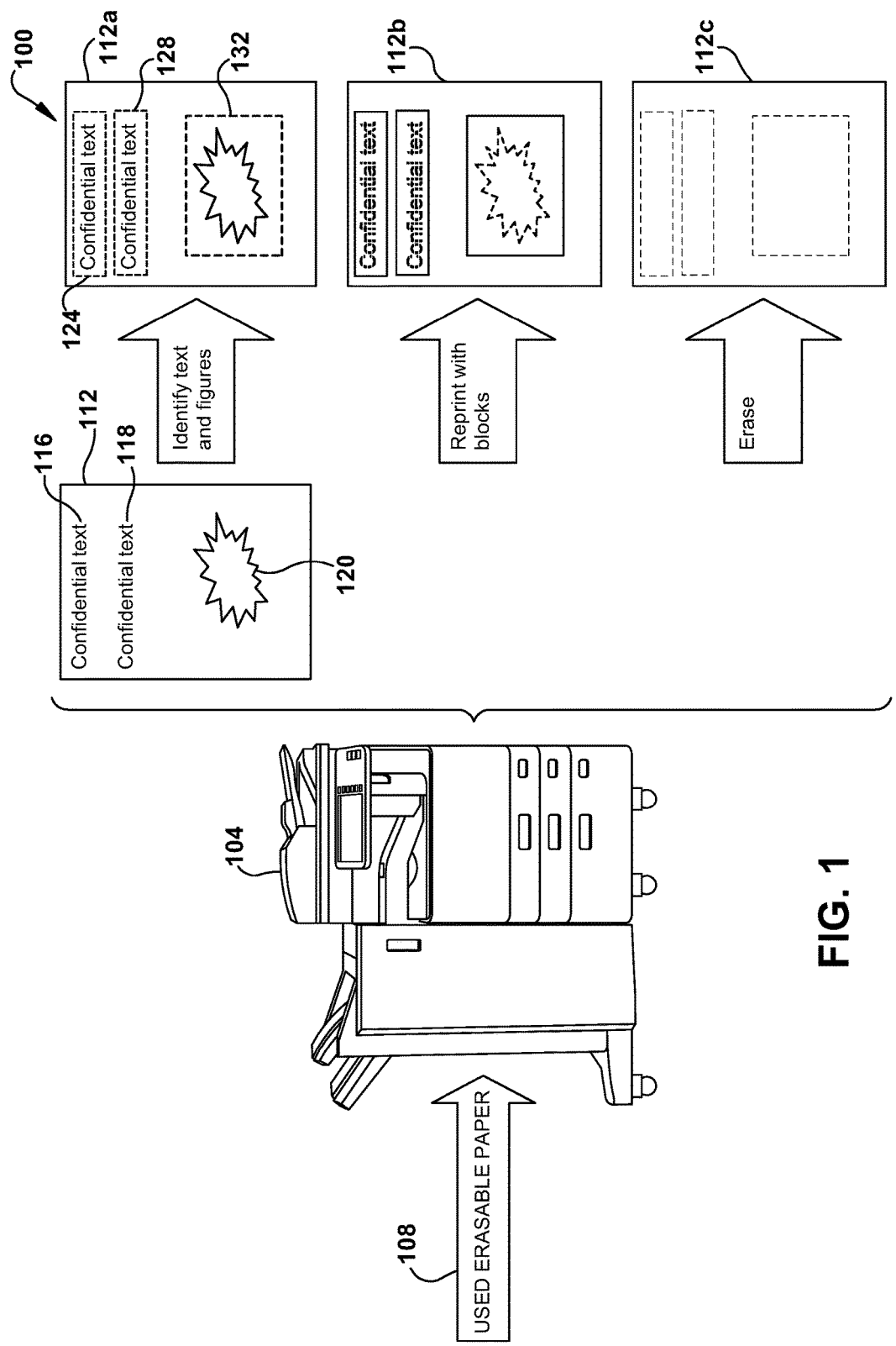
FIG. 1 is an example embodiment of obfuscating indicia on previously used and erased paper sheets.

Turning to FIG. 1, illustrated is example embodiment of a system 100 for obfuscating indicia on previously used and erased paper sheets that are being reused. MFP 104 includes a scanner and a printer. Used paper printed with erasable toner or ink is provided to MFP 104 at 108. In the illustrated example, one or more pages of used paper, such as sheet 112 include confidential indicia such as confidential text 116 and 118 or confidential graphical image 120 that are still discernable after erasure. As illustrated relative to document 112 at 112a, the document is scanned and areas document areas 124 and 128 are defined about confidential text 116 and 118, respectively. Area 132 is defined around confidential graphical image 120. A print mask is defined relative to these areas which directs a printing of ink or toner within each defined area as is illustrated at 112b. Printing is suitably done as a solid fill or other suitable pattern or indicial as will be described further below. Next, the document is subject once again to erasure as illustrated at 112c wherein the indicia are subject to erasure for a second time while the filled areas erased for the first time. The resultant, re-erased document will include obfuscation of prior, discernable indicia. Obfuscation may be even further enhanced given that the originally discernable indicia are subject to a second erasure.

Figure 2:
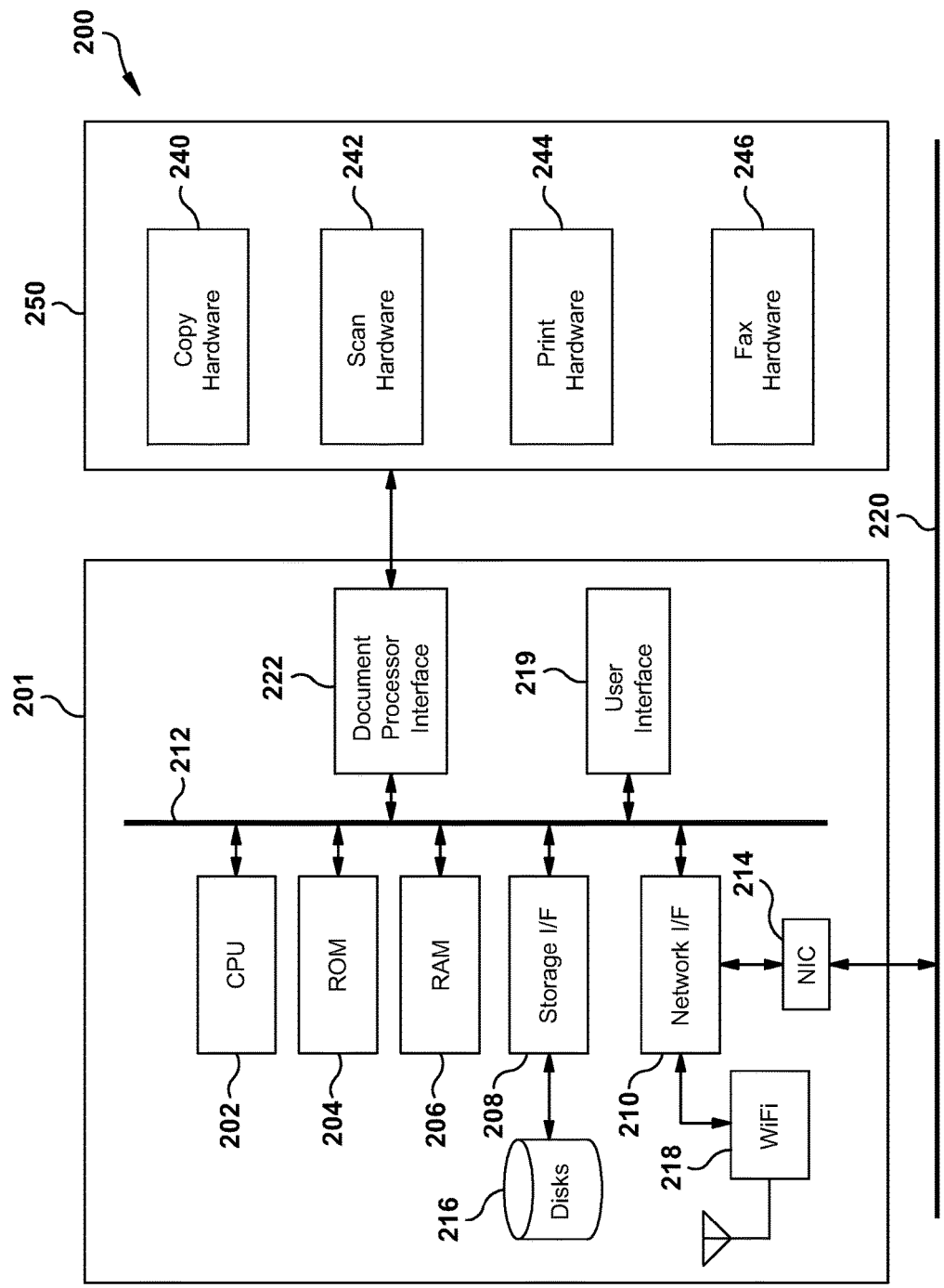
FIG. 2 is a networked document rendering system.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
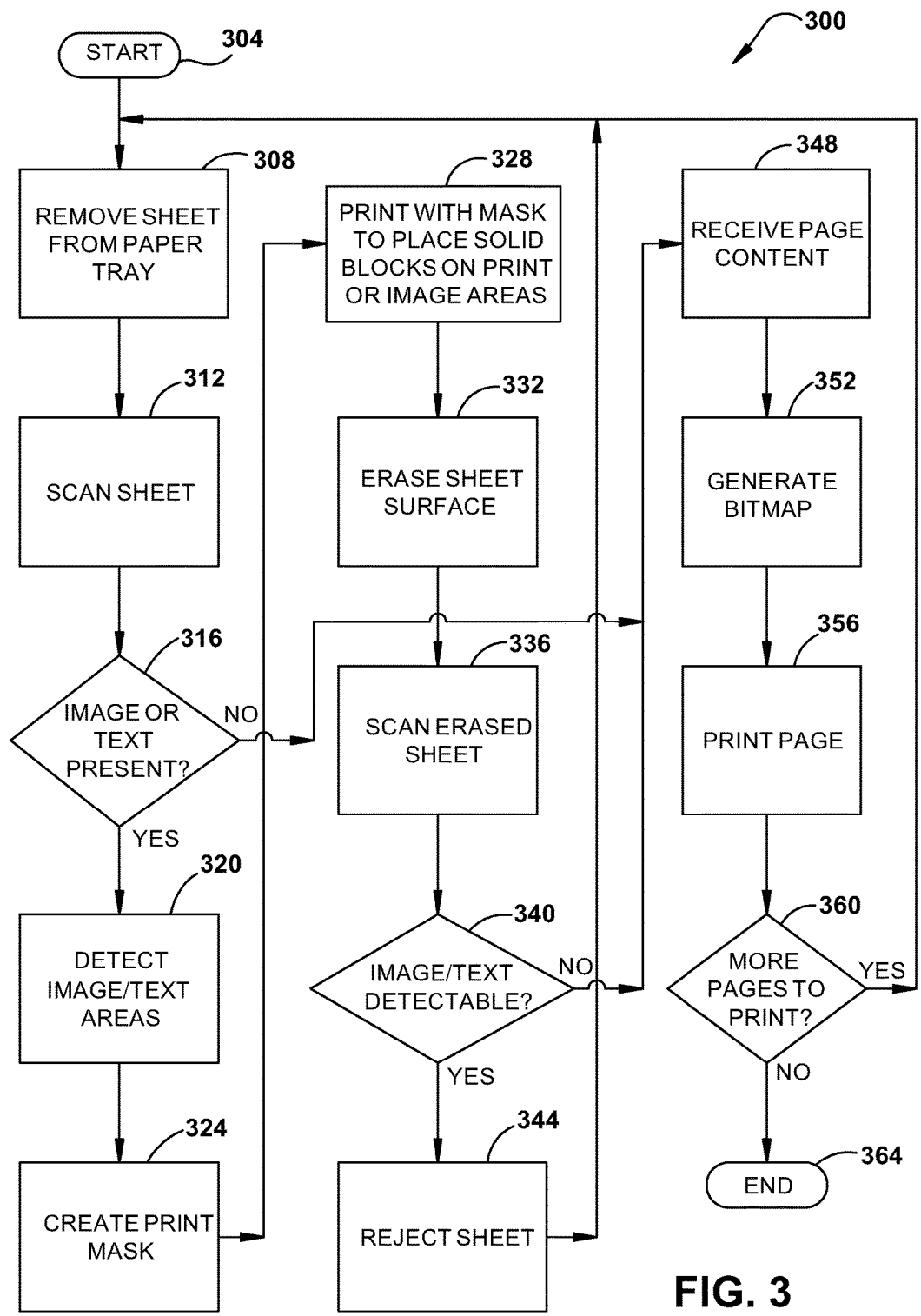
FIG. 3 is a flowchart of an example embodiment for obfuscation of indicia on previously erased media.

FIG. 3 is a flowchart 300 of an example embodiment for obfuscation of indicia on previously erased media. The process commences at block 304, and a paper sheet is picked from a paper storage bin or other paper input at block 308. The sheet is scanned at block 312 and a determination is made at block 316 as to whether visible indicia are found on the previously erased sheet. If so, one or more image areas encompassing such indicia are detected at block 320 and a print mask corresponding to the detected areas is created at block 324. It will be appreciated that areas are suitably defined as small as possible to minimize an amount of additional ink or toner needed to print over a detected area. It is possible to print over an entire printable area of the sheet which would eliminate a need to scan and define areas, with a tradeoff of use of substantially more toner than might otherwise be required. The controller may be configured to print a bitmapped image over substantially all of an image surface of a sheet when a preselected surface coverage threshold is exceed by one or more areas.

Next, a print using the generated mask is completed at block 328 on the sheet and the overprinted sheet is erased at block 332. An optional second scan can be made at block 336 to determine if an image or text is still discernable notwithstanding overprinting and erasure. This can be due to a suboptimal erasure, misplacement of print areas or degradation of paper, such as paper that has been reused beyond its limit of reusability. If detectable indicial are determined at block 340, the sheet is rejected at block 344 and the process returns to block 308 for selection of another sheet. If the page is acceptable (or if no secondary scan is performed), page content is received at 348, a corresponding bitmap is generated at block 352, and the page is printed at block 356. If more pages to print are determined at block 360, the process returns to block 308. If not, it suitably ends at block 364. If it is determined that no indicia exist at block 316, detection, overprinting and erasing can be bypassed and the process can jump to block 348.

Figure 4:
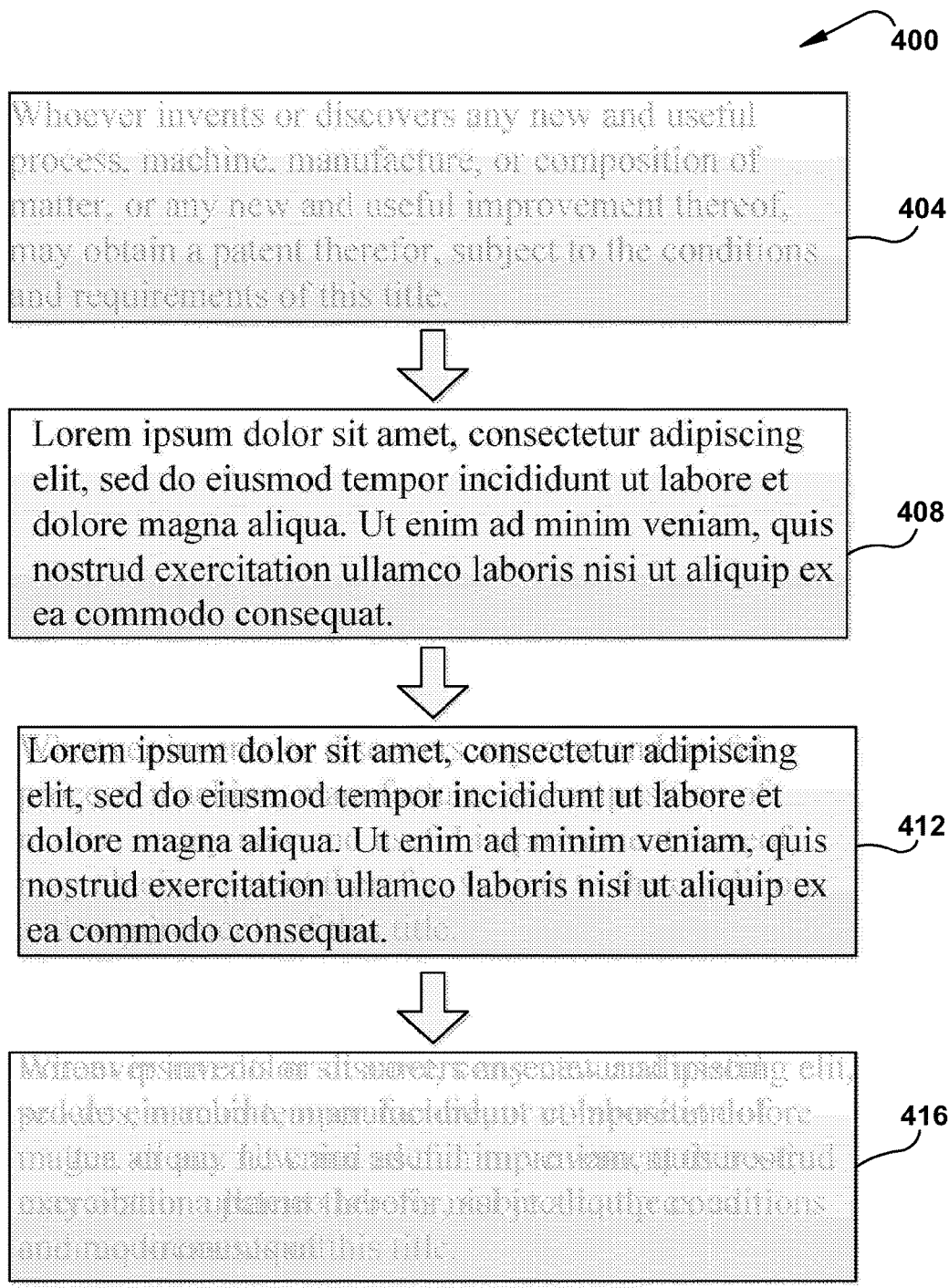
FIG. 4 is another example embodiment of obfuscating indicia on previously used and erased paper sheets.

While overprinting of areas wherein discernable indicia are present provides less toner usage then overprinting an entire printable area of a sheet, there is still a tradeoff with paper savings through reuse and additional toner needed for masking, overprinting and erasing. Turning next to FIG. 4, illustrated is an example embodiment wherein defined areas are covered with designs, patterns or characters rather than a complete area fill. This may be particularly effective to obfuscate text areas which are more likely prevalent to showing confidential or sensitive information. Illustrated in obfuscation system 400 is a previously erased sheet wherein discernable text 404 from a prior printing and erasure is still discernable. Overprint text 408 is selected. Overprint text 408 is suitably selected from a detected language, font type, font size or font property, such as bold, scripted, of the viewable text. Such properties are suitably obtained by application of an optical character recognition (OCR) operation on discernable text. In the event that characters are determined to exist via OCR, a further check may be made to see if any words can be constructed from the OCR text. If not, the sheet may have, for example, already been subject to multiple erases and reuses such that overprinting may not be required. A suitable degree of illegibility may be preset relative to sensitivity or confidentiality levels of a particular situation.

Overprint text 408 is suitably comprised of preselected words or phrases, randomized words, characters or phrases or placeholder text, such as Lorem Ipsum, illustrated as overprint text 408, which is commonly used graphic, print or publishing industries and which can be preset or generated as desired. In the illustrated example, overprint text 408 is then printed over discernable text 404 as depicted on sheet 412. This sheet is subject to erasure, appearing as non-discernable text 416 which can be created using substantially less toner than an embodiment using solid area overprints.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
    a scanner operable in conjunction with instructions received from an intelligent controller;
    a printer operable in conjunction with instructions received from the intelligent controller;
    a sheet feeder configured to communicate a paper sheet for scanning via the scanner;
    an intelligent controller including a processor and associated memory,
        the controller configured to engage the scanner to scan a paper surface of the paper sheet to generate digital image data corresponding thereto, the controller further configured analyze the digital image data to determine a presence of indicia on the paper surface, the controller further configured to identify one or more areas of the paper surface containing indicia in accordance with analysis of the digital image data, and the controller further configured to commence an erasable overprint on the areas of the paper surface containing the indicia; and a document eraser configured to erase the paper surface containing the indicia and the erasable overprint.

2. The system of claim 1 wherein the controller is further configured to generate a printout on the erased paper surface.

3. The system claim 1 wherein the overprint is comprised of a solid print area.

4. The system of claim 3 wherein the overprint is comprised of erasable toner.

5. The system of claim 3 wherein the controller is further configured to generate a print mask defining each area of the paper surface containing the indicia and wherein the overprint is completed in conjunction with the print mask.

6. The system of claim 1 wherein the controller is further configured to:

engage the scanner to scan the erased paper surface to generate a digital image data corresponding thereto, analyze the digital image data of the erased paper surface to determine a presence of indicia on the paper surface, and bypass printing on the paper sheet when the digital image data of the erased paper surface is determined to contain indicia.

7. The system of claim 1 wherein the indicia is comprised of character data.

8. The system of claim 1 wherein the indicia is comprised of image data.

9. A method comprising:

feeding a paper sheet for scanning via a scan engine;

scanning a surface of the paper sheet to generate digital image data corresponding thereto;

analyzing the digital image data to determine a presence of indicia on the paper surface by an intelligent controller including a processor and associated memory;

identifying, by the intelligent controller, one or more areas of the paper surface containing indicia in accordance with analysis of the digital image data;

overprinting on the areas of the paper surface containing the indicia; and erasing the paper surface containing the indicia and the overprint.

10. The method of claim 9 further comprising generating a printout on the erased paper surface.

11. The method of claim 9 wherein the overprint is comprised of a solid print area.

12. The method of claim 11 wherein the overprinting includes overprinting with erasable toner.

13. The method of claim 11 further comprising generating a print mask defining each area of the paper surface containing the indicia and the overprinting is in conjunction with the print mask.

14. The method of claim 9 further comprising:

scanning the erased paper surface to generate a digital image corresponding thereto, analyzing the digital image of the erased paper surface to determine a presence of indicia on the erased paper surface, and bypassing printing on the paper sheet when the digital image of the erased paper surface is determined to contain the indicia.

15. The method of claim 9 wherein the indicia is comprised of character data.

16. The method of claim 9 wherein the indicia is comprised of image data.

17. A multifunction peripheral comprising:

a scanner;

a sheet feeder configured to feed a sequence of previously used and erased paper sheets to the scanner; and an intelligent controller including a processor and associated memory, the controller configured to generate digital image data corresponding to each scanned sheet;

the controller further configured to isolate one or more areas containing discernable text or image data on at least one sheet from analysis of the digital image data, the controller further configured to generate a print mask corresponding to each isolated area for the at least one sheet, the controller further configured to commence an erasable overprint on the at least one sheet in accordance with the print mask corresponding thereto, and the controller further configured to commence a document erase operation on each overprinted sheet.

18. The multifunction peripheral of claim 17 wherein the overprint is comprised of a solid, bitmapped image.

19. The multifunction peripheral of claim 17 wherein the overprint is comprised of character data.

20. The multifunction peripheral of claim 18 wherein the controller is further configured to print the bitmapped image over substantially all of an image surface of the at least one sheet when a preselected surface coverage threshold is exceed by the one or more areas.

* * * * *